(12) United States Patent
Lin

(10) Patent No.: US 7,861,046 B2
(45) Date of Patent: Dec. 28, 2010

(54) SECURE DIGITAL HOST SECTOR APPLICATION FLAG COMPRESSION

(75) Inventor: Jason T. Lin, Santa Clara, CA (US)

(73) Assignee: SanDisk Corporation, Milpitas, CA (US)

( * ) Notice: Subject to any disclaimer, the term of this patent is extended or adjusted under 35 U.S.C. 154(b) by 555 days.

(21) Appl. No.: 11/824,183

(22) Filed: Jun. 29, 2007

(65) Prior Publication Data

US 2009/0006667 A1 Jan. 1, 2009

(51) Int. Cl.
*G06F 13/28* (2006.01)
*G06F 12/00* (2006.01)

(52) U.S. Cl. .................. 711/156; 711/100; 711/154
(58) Field of Classification Search .............. 711/156, 711/100, 154, 200
See application file for complete search history.

(56) References Cited

U.S. PATENT DOCUMENTS

2006/0026338 A1* 2/2006 Ebara et al. ............... 711/103

* cited by examiner

*Primary Examiner*—Tuan V. Thai
(74) *Attorney, Agent, or Firm*—Brinks Hofer Gilson & Lione

(57) ABSTRACT

A memory apparatus and method of operation therefore includes control by a memory controller which, in one embodiment, is configured to configure a host sector application flag table in the memory array, the flag table associating each flag value with an address in the memory array where information associated with that flag value is stored. In a second embodiment the controller is configured to (a) write at least one page of information to the memory, each page having a plurality of sectors, each of the at least one pages including a page header having a flag value associated with information written to the page, and (b) configure an exception block in memory, the exception block including exception entries, each exception entry having at least an exception flag value and address information identifying an address range in the memory array to which the exception flag value applies.

22 Claims, 3 Drawing Sheets

SD Host Sector Application Flag Table

| 4 bit CPRM | Start LBA | End LBA | Start LBA | End LBA | ........ | | |
|---|---|---|---|---|---|---|---|
| 1001 | 300 | 14CF | 342E0 | 7FFFF | ........ | FFFF | FFFF |
| 0111 | 80000 | BFFF | 100000 | 107FFF | ........ | 10 | 2FF |
| FFFF | FFFF | FFFF | FFFF | FFFF | ........ | FFFF | FFFF |
| ........ | ........ | ........ | ........ | ........ | ........ | ........ | ........ |
| ........ | ........ | ........ | ........ | ........ | ........ | ........ | ........ |
| FFFF | FFFF | FFFF | FFFF | FFFF | FFFF | FFFF | FFFF |

FIG. 2

Main User Data

| | |
|---|---|
| LBA 0 - F | 214a |
| LBA 10 - 2FF | 208 |
| LBA 300 - 14CF | 204 |
| LBA 14D0 - 342DF | 214b |
| LBA 10000 - 17FFF | 212 |
| LBA 18000 - 342DF | 214c |
| LBA 342E0 - 7FFFF | 206 |
| LBA 80000 - BFFFF | 210 |
| LBA C0000 - FFFFF | 214d |

Default w/o Security

FIG. 3

SECURE DIGITAL HOST SECTOR APPLICATION FLAG COMPRESSION

TECHNICAL FIELD

The present disclosure relates generally to non-volatile memory (NVM) devices of the SD (secure digital) family type utilizing sector-based SD application flags. It is also applicable to other sector-based flags stored in memory which may be compressed in the manner shown and described.

BACKGROUND

Turning to FIG. 1, a conventional memory device 100 is illustrated. Such memory devices are typically used for applications such as digital camera image storage, music player music file storage (e.g., MP3s), storage ancillary to cellular telephones, non-volatile electronic memory storage for computing devices and servers, and the like. Such devices include a memory array 102 of individual memory cells (single-level or multi-level) where digital information may be stored, a memory interface 104 interfacing the memory array to a memory controller 106, and one or more external interfaces (e.g., SD, USB, PCMCIA, CF, CF2, and the like which are all well known to those of skill in the art) used for coupling the memory device to another device.

In accordance with standards which define the construction and operation of such memory devices (one of which is the SD Host Controller Simplified Specification Version 2.00 (Secure Digital Association, Feb. 8, 2007)), support for host applications such as digital rights management (DRM) schemes (an example of which is CPRM (Content Protection for Recordable Media)) is assisted by storing "application flags" along with the content in the memory array of the memory device. Such DRM/CPRM schemes are sometimes referred to collectively as media content protection applications. Sometimes referred to as "sector application flags" the application flags are commonly stored one per sector (smallest eraseable memory partition) throughout the memory array in which the corresponding content is stored. Such flags typically use 5 digital bits, one of which signals the validity/invalidity of the flag and the other four of which correspond to a field used by the host media content protection application.

OVERVIEW

A memory apparatus and a method of operation therefore is provided wherein a memory array is controlled and communicated with via a memory controller. In one embodiment the controller is configured to (1) determine if information to be written to the memory is associated with application flags different from a default value, and, where such non-default flags are present and not all set to a default value, (2) configure a host sector application flag table in the memory array, the flag table associating each flag value with an address in the memory array where information associated with that flag value is stored. In a second embodiment the controller is configured to (1) determine if information to be written to the memory is associated with application flags different from a default value, and, where such non-default flags are present and not all set to a default value, (2a) write at least one page of information to the memory, each page having a plurality of sectors, each of the at least one pages including a page header having a flag value associated with information written to the page, and (2b) configure an exception block in memory, the exception block including exception entries, each exception entry having at least an exception flag value and address information identifying an address range in the memory array to which the exception flag value applies.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 2 illustrates an SD Host Sector Application Flag Table in accordance with one embodiment.

FIG. 3 illustrates the content of Main User Data block of a memory array or of a memory device in accordance with on embodiment.

DESCRIPTION OF EXAMPLE EMBODIMENTS

Figure 1:
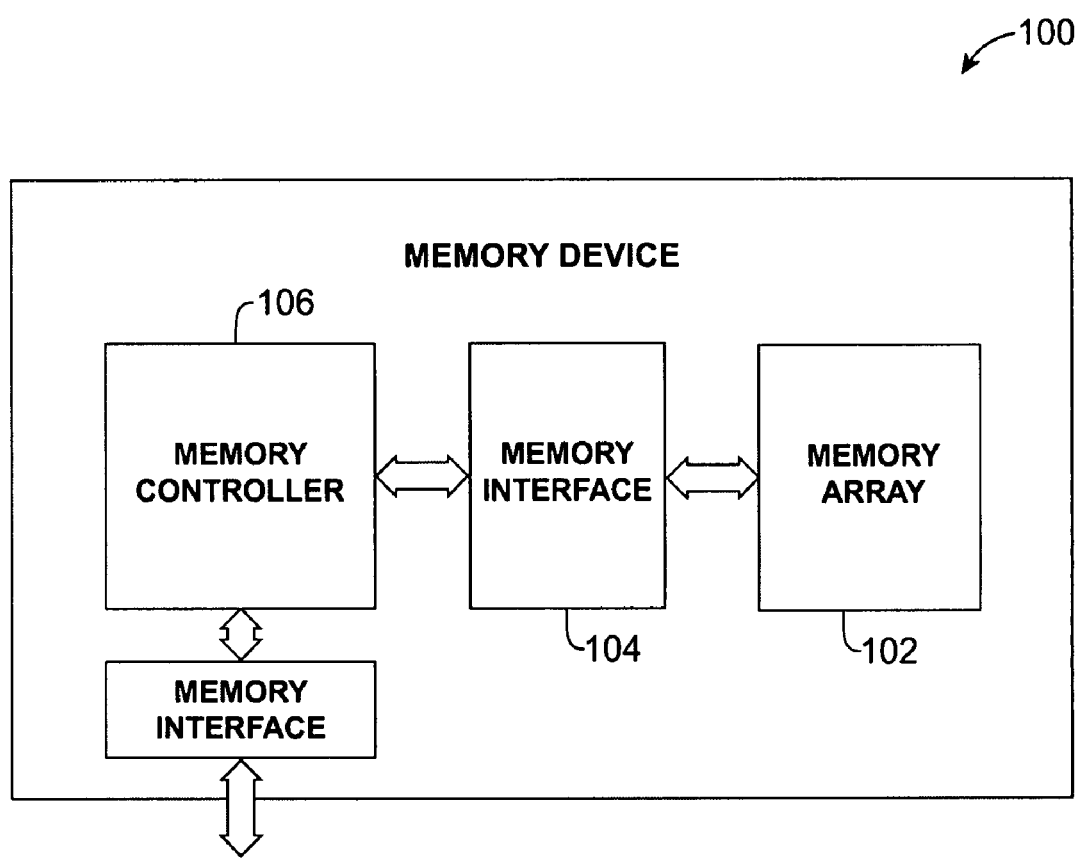
FIG. 1 is a simplified system block diagram of a conventional memory device.

Example embodiments are described herein in the context of a Secure Digital (SD) type of non-volatile memory (NVM). Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

In order to reduce the amount of memory allocated to application flags two compression schemes have been developed and are described in detail herein. The first compression scheme involves establishing a host sector application flag table that maps different flag values (e.g., 4 bits corresponds to $2^4$=16) to different segments of the logical address range of the memory. The table will typically be stored in a portion of the memory to which it corresponds but it is not a requirement that it be so co-located. The second compression scheme involves storing one or more application flags (but less than the number of sectors within a page or group of pages of memory) along with a physical page, or a group of physical pages, where a page contains multiple sectors. The host sectors that contain different application flag values within the physical page can be stored in separate blocks like a scratch pad block (SPB) where additional memory bytes are available since SPB is used to store less than a full page of data. Both schemes significantly reduce the memory capacity required to store such sector application flags, freeing the memory up for additional memory storage, additional error correction capability, and the like.

The specific case of a Secure Digital (SD) sector application flag is mainly used by SD hosts to manage SD security. In this application, the fifth bit of the flag indicates if the flag field is valid. The remaining 4 bits are the CPRM (Content Protection for Recordable Media) field to be used by the host media content protection application to un-secure the data (encryption key information). Those of ordinary skill in the art will now realize that the techniques described herein have applicability to other situations in which application flags and things similar to application flags are stored along with each sector. The SD application flag table would generally be created in accordance with this scheme only in situations where valid application flag entries exist that are different from a default application flag value (e.g., 0000), i.e., where no media content protection host application and no other host application utilizing application flags is operating, no flag table need be created. The 4-bit CPRM field means that there shall be a maximum of 16 segments where the host data shall reside. (Other applications could be created with larger (or smaller) fields and correspondingly larger (or smaller) maximum numbers of segments).

Turning again to the figures, FIG. 2 illustrates an SD Host Sector Application Flag Table 200 in accordance with one embodiment. Valid flag values are listed in the left-most column. In this example two valid values are shown—"1001" and "0111". The rest of the column is denoted "FFFF" which simply means that it is not valid. Associated with the "1001" entry are a list of memory address pairs (e.g., 204*a* and 204*b* (corresponding to memory block 204 in FIG. 2) and 206*a* and 206*b* (corresponding to memory block 206 in FIG. 2)) each consisting of a Start LBA (start of logical block address) and End LBA (end of logical block address) value. This defines the range of memory addresses (e.g., 300-14CF and 342E0-7FFFF in hexadecimal) to which the flag "1001" is applicable. Thus for each of the valid flag values, a list defining corresponding memory blocks to which the flag value applies is provided. Alternatively, a start address and a length may be provided instead of a start and an end address, or an end address and a length could be provided as all would equivalently define the memory ranges applicable to a particular flag value.

FIG. 3 illustrates the content of Main User Data block 300 of a memory array or "core" of a memory device in accordance herewith. the blocks designated 214*a*, 214*b*, 214*c* and 214*d* are not associated with an application flag and are therefore not included in Table 200. The memory block 208 corresponds to memory ranges 208*a*-208*b* (associated with flag "0111"); the memory block 212 corresponds to memory ranges 212*a*-212*b* (associated with flag "0111"); and the memory block 210 corresponds to memory ranges 210*a*-210*b* (associated with flag "0111").

For example, if this technique is deployed on a current generation 16 Gb (gigabit) device that is not utilizing the sector application flags, the saved memory capacity can be as much as 6016 KB (kilobytes). If a 768 KB SD Host Sector Application Map block is required, then the saving drops to 5248 KB.

The second scheme is now discussed in more detail. This approach stores the application flag in the same physical page or pages along with the host data but with one, or several, flag entries representing all sectors within the page or group of pages. This means that instead of (for example) having a 5-bit flag used for each sector, there will be an entry representing all sectors. The host sectors within the same physical page containing different flag values shall be stored in a special block of memory like a scratch pad block. Again, those of ordinary skill in the art will realize that while this scratch pad block would normally be stored in the main memory of the device, there is no requirement that it be stored there and it could alternatively be stored somewhere else if so desired.

Figures 4, 5:
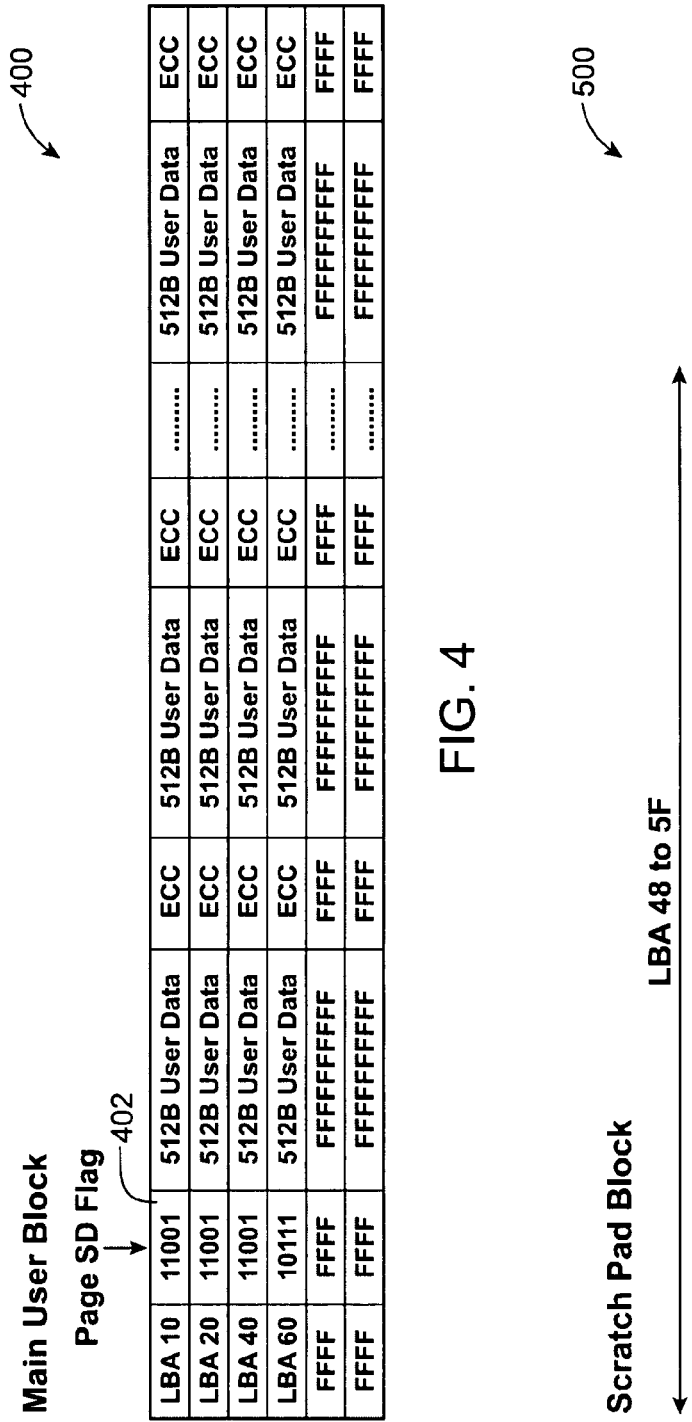
FIG. 4 illustrates a main user block of memory in accordance with one embodiment.
FIG. 5 illustrates a scratch pad memory block in accordance with the embodiment of FIG. 4.

FIG. 4 illustrates a main user block of memory 400 in accordance with one embodiment. FIG. 5 illustrates a scratch pad memory block 500 in accordance with that embodiment. In the Main user block of memory 400 at address LBA10 there is a flag "11001" 402 which includes a valid bit "1" and a flag "1001" followed by 512 Bytes of user data (corresponding to one sector), ECC (error correction code) data, another sector, ECC data for that sector, and so on. Flag 402 is associated with the various sectors of data from the page LBA10. Each of the pages LBA10, LBA20 and LBA40 has a flag "11001" associated with it. Page LBA60 has a different flag "10111" associated with it.

The scratch pad block 500 is used essentially to record exceptions to the flag status reflected in the main user block of memory 400. Thus within the LBA40-LBA5F address range which is associated with flag "11001" at the main user block of memory 400, an exception exists because the address range LBA48-LBA5F should be associated not with flag "11001" but instead with flag "10111".

In accordance with this compression scheme, the maximum benefit where no security is used would be 5640 KB.

Note that where additional memory savings are important, the scratch pad block may optionally be compressed using conventional data compression techniques as can the SD Host Sector Application Flag Table from the first embodiment described above.

Note also that at present the first embodiment is presently preferred because this approach achieves a high degree of compression of the flags and, in fact, if the host does not require the flags (e.g., media content protection is not enabled), then no table needs to be created at all. By checking the flag valid bit in each sector of memory it can be easily determined if an entry in the table needs to be created or updated. To avoid excessive updates to the table, the table may be updated for a logical address range only when a host application (such as a media content protection application) requires a change within an existing address range.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An apparatus comprising:
   a memory array;
   a controller;
   wherein the controller is configured to:
      communicate with the memory array;
      determine if information to be written to the memory array is associated with application flags different from a default value; and
      where such non-default flags are present and not all set to the default value, configure a host sector application flag table in the memory array, the host sector application flag table associating each flag value with an address in the memory array where information associated with that flag value is stored.

2. The apparatus of claim 1, wherein the host sector application flag table includes at least one flag value, and a list of beginning and ending address pairs of information associated with the at least one flag value.

3. The apparatus of claim 1, wherein the host sector application flag table includes at least one flag value and a list of beginning addresses and corresponding information length values associated with the at least one flag value.

4. The apparatus of claim 1, wherein the flag values include encryption key information associated with a media content protection application.

5. The apparatus of claim 1, wherein the host sector application flag table is co-located with a section of the memory array to which the host sector application flag table corresponds.

6. A method for operating a memory, the method comprising:
   using a controller to cause information to be written to the memory;
   determining at the controller if information to be written to the memory is associated with application flags different from a default value; and
   configuring, where such non-default flags are present and not all set to the default value, a host sector application flag table in the memory, the host sector application flag table associating each flag value with an address in the memory where information associated with that flag value is stored.

7. The method of claim 6, wherein in the configuring step, the host sector application flag table is configured to include at least one flag value and a list of beginning and ending address pairs of information associated with the at least one flag value.

8. The method of claim 6, wherein in the configuring step, the host sector application flag table is configured to include at least one flag value and a list of beginning addresses and corresponding information length values associated with the at least one flag value.

9. The method of claim 6, wherein the flag values include encryption key information associated with a media content protection application.

10. The method of claim 6, wherein the host sector application flag table is co-located with a section of the memory to which the host sector application flag table corresponds.

11. Computer program logic embodied in a computer readable storage medium that when executing on one or more computers, performing steps of:
   cause a controller to cause information to be written to a memory;
   determine at the controller if information to be written to the memory is associated with application flags different from a default value; and
   configure, where such non-default flags are present and not all set to the default value, a host sector application flag table in the memory, the host sector application flag table associating each flag value with an address in the memory where information associated with that flag value is stored.

12. An apparatus comprising:
   a memory array;
   a controller;
   the controller configured to:
      communicate with the memory array;
      determine if information to be written to the memory array is associated with application flags different from a default value; and
      where such non-default flags are present and not all set to a default value;
         write at least one page of information to the memory array, each page having a plurality of sectors, each of the at least one pages including a page header having a flag value associated with information written to the page, and
         configure an exception block in the memory array, the exception block including exception entries, each exception entry having at least an exception flag value and address information identifying an address range in the memory array to which the exception flag value applies.

13. The apparatus of claim 12, wherein the address information of the exception entries includes beginning and ending addresses corresponding to the address range.

14. The apparatus of claim 12, wherein the address information of the exception entries includes beginning addresses and lengths corresponding to the address range.

15. The apparatus of claim 12, wherein the flag values include encryption key information associated with a media content protection application.

16. The apparatus of claim 12, wherein the controller is configured to store one or more flags values along with the page; and
   wherein the one or more flag values are less than a number of sectors within a page or group of pages of the memory array.

17. The apparatus of claim 12, wherein the controller is configured to store a single flag entry representing all sectors within the page; and
   wherein the controller is configured to store different flag entries in the exception block, the different flag entries being different from the single flag entry.

18. A method for operating a memory device, the method comprising:
   using a controller to cause information to be written to a memory array;
   determining at the controller if information to be written to the memory array is associated with application flags different from a default value;
   writing, where the non-default flags are present and not all set to a default value, at least one page of information to the memory array, each page so written having a plurality of sectors, each of the at least one page including a page header having a flag value associated with information written to the page, and configuring an exception block in the memory array, the exception block including exception entries, each exception entry having at least an exception flag value and address information identifying an address range in the memory array to which the exception flag value applies.

19. The method of claim 18, wherein the address information of the exception entries includes beginning and ending addresses corresponding to the address range.

20. The method of claim 18, wherein the address information of the exception entries includes beginning addresses and lengths corresponding to the address range.

21. The method of claim 18, wherein the flag values include encryption key information associated with a media content protection application.

22. The method of claim 18, wherein writing at least one page of information to the memory array comprises writing a single flag entry representing all sectors within the page; and wherein configuring the exception block comprises storing different flag entries in the exception block, the different flag entries being different from the single flag entry.

* * * * *